Sept. 25, 1962

B. TEBB ETAL 3,055,388

LIQUID PRESSURE CONTROL VALVES

Filed May 20, 1959

Inventors
Bernard Tebb
Clarence Herbert Perry
By
Mead, Browne, Schuyler & Beveridge
Attorneys Sept. 25, 1962   B. TEBB ETAL   3,055,388
LIQUID PRESSURE CONTROL VALVES
Filed May 20, 1959   4 Sheets-Sheet 2

Inventors
Bernard Tebb
Clarence Herbert Perry
By
Mead, Browne, Schuyler & Beveridge
Attorneys

3,055,388
LIQUID PRESSURE CONTROL VALVES
Bernard Tebb, Swanland, and Clarence Herbert Perry, Hull, England, assignors to Mastabar Mining Equipment Company Limited, Marfleet, England, a British company
Filed May 20, 1959, Ser. No. 814,610
Claims priority, application Great Britain May 22, 1958
4 Claims. (Cl. 137—469)

This invention concerns fluid pressure control valves.

Where fluid pressure operated apparatus is dependent for its operation upon the transfer of fluid from a reservoir to a pressure chamber, an excess pressure relief valve is usually provided in the pressure chamber to ensure that the pressure therein is not allowed to rise beyond a predetermined maximum limit. Such excess pressure relief valves, or yield valves, are almost invariably provided, for example, in telescopic hydraulic supports such as pit props and the like supports used in mining operations to enable the prop to yield in response to roof movement and to control such movement.

When the valve member of such a yield valve lifts from its seat, there is an immediate fractional drop in pressure which, for example in the yield valve of a hydraulic pit prop, results in shedding of the load, but unless this pressure release is restrained and kept within very narrow limits there is danger of the prop contracting too rapidly to give continued controlled support to the roof. Therefore, it is extremely desirable that in a yield valve, the return of the valve member to its seat subsequent to a pressure-relieving opening movement should be executed with the minimum of delay.

It is an object of the invention, in a yield valve or excess pressure relief valve, as aforesaid, and wherein the valve member is spring biased towards the valve seat, to provide means for assisting the spring to accomplish closing movement of said valve member.

According to the present invention, the opening movement of the valve member in a yield valve is employed to generate a rebound force impulse applied to the rear face of the valve member in order to assist the valve spring in returning said valve member on to the valve seat.

The rebound force impulse which assists the valve spring in returning the valve member to its seat may conveniently be a fluid pressure impulse. Thus, in one embodiment of the invention, the rear face of a piston carrying the valve member forms one wall of a substantially closed chamber, which becomes filled with oil escaping from the pressure chamber when the valve is first put into service, there being a small clearance around the piston for this purpose. In subsequent operation of the valve, opening movement of the valve member then sets up a back pressure impulse in the oil trapped in the closed chamber, and this back pressure impulse is reflected back on to the rear face of the piston carrying the valve member in order to augment the force of the valve spring in restoring the valve member to closed condition.

If desired, the valve seat may itself be presented by a movable member which is initially displaceable, under applied pressure, in a direction opposed to the resilient seating force. In this way the valve seat is cushioned against the full impact of valve member closing movements, and deterioration of the valve seat is delayed.

According to another feature of the invention, the chamber in which the back pressure impulse is developed communicates with a closed auxiliary chamber serving to retain a volume of pneumatic medium constituting a pneumatic spring which is compressed by the opening movement of the valve member and which, on expansion, acts to augment the said rebound impulse.

Preferably in this embodiment of the invention, the valve comprises a housing formed with an inlet bore presenting a seat for the valve member, and with an internal chamber behind said valve member and receiving a valve spring engaged therewith, the auxiliary chamber being formed in the valve housing in series with the spring chamber. The auxiliary chamber may, if desired, be contained wholly within the valve housing, but in a preferred construction, wherein the housing is a so-called capsule adapted removably to be engaged in a piece of hydraulic apparatus, a lateral bore extends from the spring chamber through the capsule wall, and a pair of sealing rings are arranged one on either side of said bore in such a manner that, when the capsule is positioned within an opening provided therefor in the wall of said hydraulic apparatus, said seals engage against the last-mentioned wall and cause said bore, together with any clearance which may be provided around the capsule between said seals, to constitute the said auxiliary chamber.

The invention will be described further, by way of example, with reference to the accompanying drawings in which.

In the drawings and the following description, like reference numerals are used wherever appropriate to denote like parts.

Figure 1:
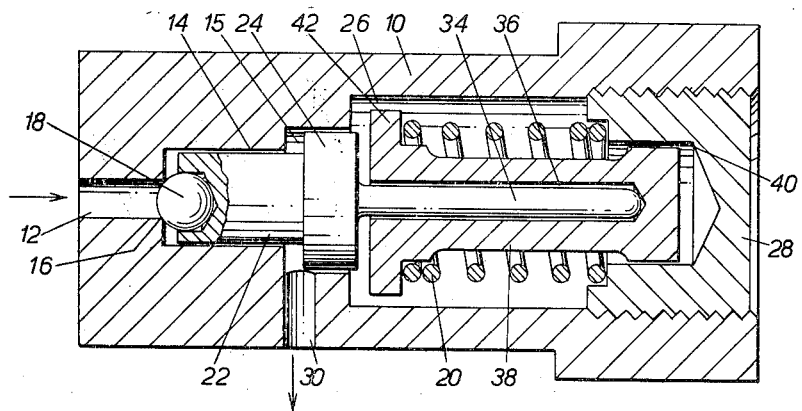
FIG. 1 is a longitudinal section through a hydraulic yield valve wherein a pressure force impulse is applied to the valve member to assist closing movements thereof.

Referring firstly to FIG. 1 of the drawings, the hydraulic yield valve shown therein comprises a housing 10 formed with an axial inlet port 12 adapted to communicate with a pressure or working chamber (not shown) to which hydraulic medium is transferred under pressure from a reservoir (not shown) in the operation of a device, such as a hydraulic pit prop to which the valve is fitted. The inlet port 12 is counterbored at 14 to present a valve seat 16 against which a ball valve member 18 is urged into sealing relation by means of a valve spring 20. The valve member 18 is carried by a piston 22 longitudinally displaceable in the counterbore 14, and the piston 22, at its end remote from the valve member 18, is provided with a back-up piston 24, the rear face of which constitutes one end wall of an otherwise completely closed chamber 26 wherein the spring 20 is contained. At the end thereof opposite the back-up piston 24, the spring chamber 26 is closed by a threaded plug 28, engaged in the housing 10. From the chamber 26, an outlet port 30 is adapted to communicate with the reservoir, and there extends from the back-up piston 24, a probe 34 which rests in a blind bore 36 of a guide bush 38 slidable in a cylindrical recess 40 in the plug 28. The spring 20 extends from an annular shoulder 42 on the guide bush 38, around said bush, and against the plug 28. This arrangement assists in centralising the spring restoring force applied by the spring 20 to the valve member 18.

It is to be noted that in this embodiment of the invention, in addition to a small clearance between the piston 22 and the counterbore 14, a further small clearance, which may conveniently be of the order of ten thousandths of an inch, is provided between the back-up piston 24 and a second counterbore 15 communicating between the chamber 26 and the counterbore 14. Due to the provision of this further clearance, some of the hydraulic medium which escapes from the pressure chamber when the valve is initially put into service enters and eventually fills the spring chamber 26, where sufficient of it remains trapped by reason of the small dimensions of said further clearance to maintain chamber 26 substantially filled.

Thus, in subsequent operation of the valve, any loss which there may have been from the spring chamber 26 is made good immediately the pressure in the pressure chamber causes the valve member 18 to lift from the seat 16, and at the same time, this opening movement of the valve member 18 generates in the hydraulic medium trapped in the chamber 26, due to movement of the back-up piston 24, a back pressure impulse which moves towards the plug 28 and is reflected therefrom so as to rebound on to the rear face of the back-up piston 24 and assist the spring 20 in restoring the same to its rest positon in which the valve member 18 is in sealing relation on the seat 16. This back pressure thus minimises the delay between opening of the valve and subsequent closing thereof, and repeated operation of the valve occurs if a single opening and closing cycle is insufficient to permit the desired pressure drop in the pressure chamber.

Figure 2:
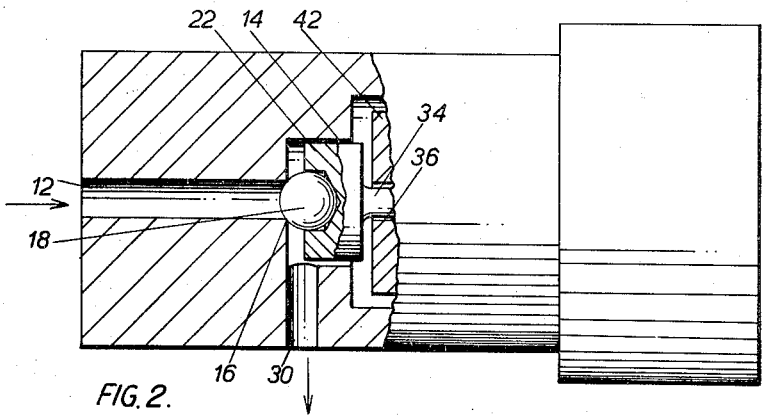
FIG. 2 is a longitudinal section through another embodiment of a valve similar to that of FIG. 1.

FIG. 2 illustrates another form of hydraulic yield valve which is similar in construction and operation to that of FIG. 1, with the exception that the back-up piston 24 of FIG. 1 is here omitted, and the single piston 22, from which the probe 34 extends into the guide bush 38, is positioned with its front face in alignment with the outlet port 30. In operation of the valve of FIG. 2, high pressure hydraulic medium issuing into the outlet port 30 in front of the piston 22 provides a thrust on the latter generating a back pressure impulse in the oil trapped in the spring chamber 26, and the reflection of that back pressure impulse on to the rear face of the piston 22, as in the previous embodiment, provides a force assisting the spring in returning the valve member 18 on to the seat 16.

Figure 3:
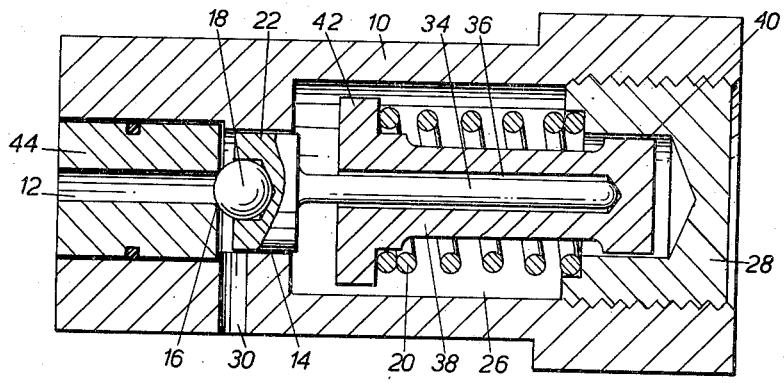
FIG. 3 is a longitudinal section through a valve similar to that of FIG. 2, but wherein the valve seat is displaceable.

FIG. 3 shows an embodiment of valve which is similar to that of FIG. 2, except that the valve seat 16 is provided in a displaceable bush 44 urged towards the valve member by the pressure of the hydraulic medium in the pressure chamber, the inlet port 12 being formed in the displaceable bush 44. At the instant of closing on to the seat 16, the impact of the valve member 18 is thus cushioned by the ability of the bush 44 to yield against the pressure of the hydraulic medium in the pressure chamber, and a safeguard is thus provided against premature deterioration of the valve seat 16. In all other respects, the construction and operation of the valve shown in FIG. 3 is identical with that of FIG. 2.

Figure 4:
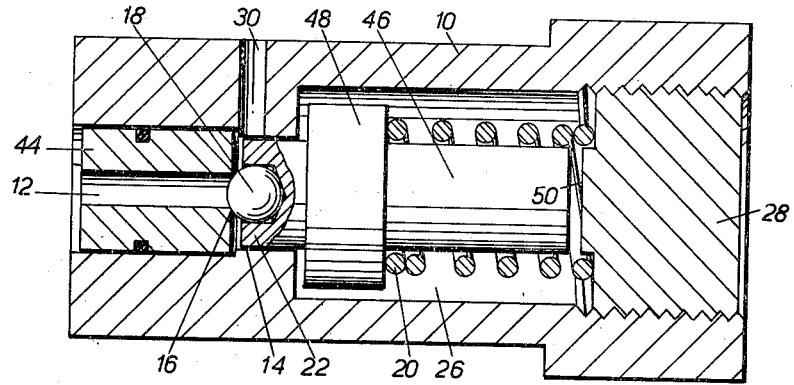
FIGS. 4 and 5 are similar sections through modified embodiments of the valve of FIG. 3.
Figure 5:
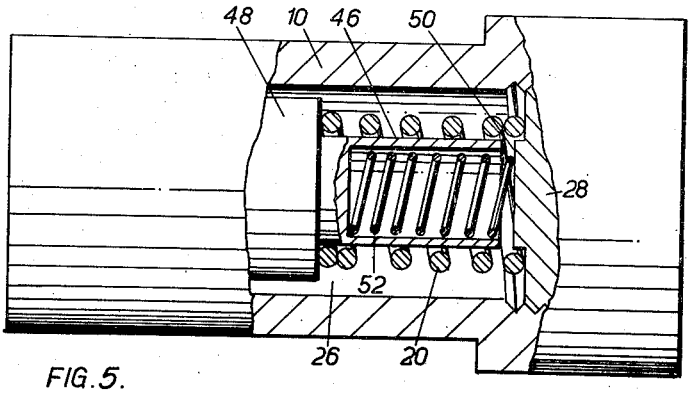

It will be appreciated that in the valves proposed by the invention, it is important to maintain accurately centralised guiding of the movement of the piston 22, and the constructions shown in FIGS. 4 and 5 represent modifications of the construction of FIG. 3 wherein sliding contact and consequent wear between guiding surfaces, such as between the bush 38 and recess 40 of FIG. 3 are avoided. In FIG. 4 the piston 22 is rearwardly extended to present a spigot 46 of a diameter commensurate with that of the piston itself, and which is embraced by the valve spring 20. An annular abutment 48 is arranged between the piston 22 and spigot 46 to receive one end of the spring 20, and a second abutment 50, to receive the other end of the spring 20, is formed on the plug 28. FIG. 5 is somewhat similar to FIG. 4 but here the spigot 46 is formed hollow, and a second valve spring 52 is arranged therein, also to abut against the abutment 50 of the plug 28. The second valve spring 52 serves to further augment the closing force on valve member 18. Apart from the modifications specified in respect of the elements 46 to 52, the construction and operation of the valves of FIGS. 4 and 5 is identical with that of FIG. 3.

Figure 6:
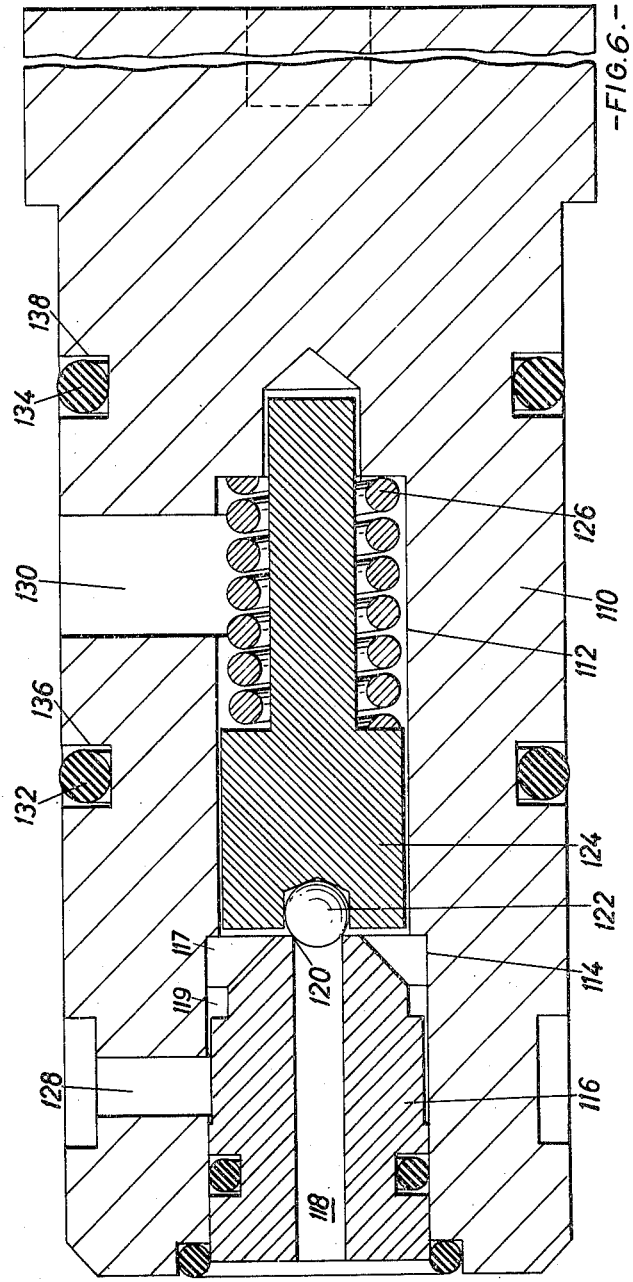
FIG. 6 is an axial, sectional elevation of another fluid pressure control valve embodying the invention.

Referring now to the valve shown in FIG. 6, a housing 110 is formed with an axial bore 112 which is counterbored at 114 to receive a displaceable bush 116. The bush 116 is itself axially bored to provide an inlet port 118 which, at its inner end, constitutes a valve seat 120 for a valve member 122 carried by a piston-like carrier 124 received in the bore 112 of housing 110 and resiliently urged towards the seat 120 by means of a spring 126 also received in the bore 112. The counterbore 114 is intercepted by a radial bore 128 constituting an outlet port from the housing 110, and a further radial bore 130 is formed to intercept the spring chamber portion of bore 112 and to act as a part of an auxiliary chamber thereto. For this purpose, the housing 110 is provided with a pair of circumferential grooves 136, 138 arranged one on either side of the bore 130, and resilient sealing rings 132 and 134 respectively seated in said grooves.

Thus, when the housing 110, which constitutes a so-called valve capsule, is positioned within an opening provided therefor in hydraulic apparatus, the rings 132 and 134 engage against the wall of said opening to close the bore 130, which then, together with any clearance which may be arranged around the housing 110 between the rings 132 and 134, constitute an auxiliary chamber communicating with the spring chamber 112.

In the operation of the valve of FIG. 6, when the fluid pressure acting through the inlet port 118 and tending to lift the valve member 122 off the seat 120 reaches a value sufficient to overcome the seating force of spring 126, the valve member 122 is moved clear of said seat and pressure fluid is allowed to pass, via grooves 117 and an annulus 119 in the bush 116, to the outlet port 128 through the clearance between the bush 116 and bore 114. When the valve is initially put into operation, however, some of the pressure fluid escaping past the valve member 122 finds its way into the spring chamber 112 through the clearance around the piston-like carrier 124, and hence, together with the air entrapped in that chamber and in the auxiliary chamber, forms a hydro-pneumatic spring which is compressed by the carrier on opening movement of the valve member 122, and which, on recovering, acts to assist the carrier 124 in returning the valve member on to its seat. It is believed that this action is further assisted by resilient deformation of the sealing rings 132 and 134 as the valve member 122 lifts from its seat, and subsequent recovery of said rings as the valve member closes again.

Figure 7:
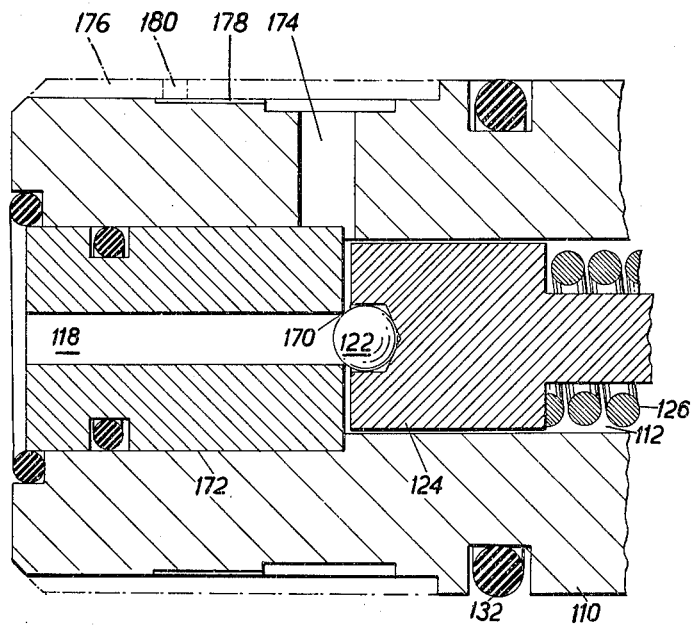
FIG. 7 is a modification of the valve shown in FIG. 6.

FIG. 7 shows a modification of the valve described with reference to FIG. 6, wherein the valve seat 170 is presented at a plane end of a displaceable bush 172, and pressure medium issuing through the inlet port 118 when the valve member 122 is unseated escapes to the outlet port 174 between the plane seat, the valve member, and the opposing end of the piston-like carrier 124. In this embodiment of the invention, apart from the simplification thus effected to the bush 172 and valve seat 170, the latter is also in line with the outlet port 174, and hence the effective size of the latter (and therefore the restriction offered to escaping fluid) is dependent upon the position of the bush 172. It will be noted that, dependent upon the clearance provided between the housing 110 and the bore in which the valve is arranged in the hydraulic apparatus, the escaping fluid may experience a further restriction in passing along that clearance. A similar effect may be achieved, if the valve is to be independent of that bore, by arranging a sleeve 176 (as shown in chain-dotted lines in FIG. 7) over the inner end of the valve to cover the outlet port 174 and to cause the escaping fluid to traverse a restricted clearance 178 between such sleeve 176 and the housing 110 before it is allowed to pass through an aperture 180 to a reservoir or other low pressure chamber.

In any of the embodiments of the invention employing a displaceable valve seat, means operable externally of the housing 10 or 110 may be provided to move the bush and valve seat away from the valve member, and hence allow pressure medium to pass to the reservoir even before the pressure tending to unseat the valve member is sufficient to do so.

We claim:

1. For use in hydraulic apparatus, a liquid pressure relief valve comprising a generally cylindrical housing formed intermediate its ends with an axial main chamber and with an axial bore extending between said chamber and one end of said housing, a displaceable bush arranged in said axial bore and provided with a fluid inlet port, the inner end of said inlet port being surrounded by a valve seat, there being an outlet port formed behind said valve seat between the exterior of said housing and said axial bore, said displaceable bush cooperating with said axial bore to restrict the path of flow from inlet port to the outlet port, a piston displaceably arranged in said main chamber and being free of sliding contact with the walls thereof, said piston presenting a pressure responsive face to the inlet of greater area than the cross sectional area of the inlet and co-operating with said chamber to define an annular fluid flow restricting passage within said chamber and around said piston, a valve member mounted on said piston for engagement on said valve seat, a spigot extending axially and rearwardly from said piston into said main chamber, said chamber having an axial blind recess formed at its end remote from said axial bore, the free end of said spigot being engaged in said blind recess, spring means embracing said spigot and urging said piston and valve member towards said valve seat, an auxiliary chamber formed radially in said housing and communicating with said main chamber, and a pair of sealing rings embracing said housing one one either side of said auxiliary chamber, said sealing rings being adapted to cooperate with adjacent hydraulic apparatus to close said auxiliary chamber and entrap a volume of air therein, and said main chamber being adapted, by means of said fluid flow restricting passage, to become filled with hydraulic medium when said valve is put into service, said main chamber and said auxiliary chamber thereby constituting a hydropneumatic restoring means assisting said spring means in reseating the valve member following an opening movement thereof.

2. A fluid pressure relief valve as set forth in claim 1 including a groove formed in the end face of the displaceable bush adjacent the valve seat, and an annulus communication with the groove formed in the displaceable bush between the end face and the outlet port.

3. A liquid pressure relief valve comprising a housing having an inlet for connection with high pressure fluid and an outlet for conducting fluid flow from the inlet to a region of low pressure, a valve seat formed at the inner end of the inlet, a cylindrical chamber formed in the housing coaxial with the inlet and having a closed end remote from the inlet and valve seat, a spring having one end seated against the closed end of the chamber, a piston member carried by the spring forming a movable wall for the chamber, a valve member mounted on the outer face of the piston member and biased onto the valve seat by the spring to close the inlet, the outer face of the piston being of substantially greater area than the cross sectional area of the inlet, a circumferential clearance between the piston member and the wall of the chamber constituting an annular fluid flow restricting passage around the piston between the inlet and the chamber permitting the chamber to become filled with fluid from the inlet when the valve is put into service, and means defining a restricted passage from the inlet to the low pressure region when the valve is open whereby upon opening movement of the valve the forward face of the piston member is abruptly subjected to high pressure from the inlet causing rapid movement of the piston and valve member away from the valve seat and setting up in the fluid trapped in the chamber a back pressure impulse for reflection onto the rear face of the piston.

4. A valve as set forth in claim 3 comprising a sleeve embracing the exterior region of said housing at which said outlet port opens to define said restricted passage for conducting fluid flow from the inlet to the low pressure region.

References Cited in the file of this patent

UNITED STATES PATENTS

| | | |
|---|---|---|
| 502,252 | Hanna | July 25, 1893 |
| 704,557 | Michener | July 15, 1902 |
| 973,211 | Reynolds | Oct. 18, 1910 |
| 1,032,482 | Jerauld | July 16, 1912 |
| 1,305,964 | Dickson | June 3, 1919 |
| 2,339,101 | Parker | Jan. 11, 1944 |
| 2,415,258 | Parker | Feb. 4, 1947 |
| 2,686,534 | Montelius | Aug. 17, 1954 |
| 2,704,549 | Strnad | Mar. 22, 1955 |